July 12, 1966  C. F. MORAIN  3,260,390
PIPE CONVEYOR FOR WRAPPING MACHINES AND THE LIKE
Filed July 30, 1964  2 Sheets-Sheet 1

INVENTOR.
CLIFFORD F. MORAIN
BY
*Francis J. Klempay*
ATTORNEY

INVENTOR.
CLIFFORD F. MORAIN
BY
ATTORNEY

United States Patent Office 3,260,390
Patented July 12, 1966

3,260,390
PIPE CONVEYOR FOR WRAPPING MACHINES AND THE LIKE
Clifford F. Morain, Burgett Road, Youngstown, Ohio
Filed July 30, 1964, Ser. No. 386,179
3 Claims. (Cl. 214—339)

This invention relates to a pipe conveyor, and more particularly to an improved and simplified conveyor which is operative to simultaneously advance the pipe longitudinally and rotate it about its longitudinal axis. Such equipment finds widespread use in pipe cleaning, coating and wrapping equipment, for example. When used in such equipment, it is desirable that the center line of the pipe be kept at a constant elevation to minimize adjustment of the working apparatus thereof, and it is also desirable that the tractive effort applied to the pipe both for rotation and for longitudinal advancement be kept fairly constant. This not only avoids marring of the exterior surface of the pipe and its coverings but also insures the proper operation of the working apparatus.

It is accordingly the primary object of the present invention to provide a pipe conveying assembly for moving pipe along the spiral path in which the elevation of the center line of the pipe remains fairly constant regardless of variations in the diameter of the pipe, in which the pipe is securely cradled and adequately driven, also regardless of its diameter. An ancillary object of the invention is the provision of apparatus having these characteristics which is readily adjustable in gang fashion from a central control point for handling pipe of different diameters, and which is also readily adjustable from a central control point to change the pitch or lead of the spiral path which the pipe takes along the conveyor.

A further object of the invention is the provision in a spiral pipe conveyor of simplified, yet improved means of driving the supporting rolls thereof.

The above and other objects and advantages of the invention will become apparent upon consideration of the following specification and the accompanying drawing wherein there is disclosed a preferred embodiment of the invention.

Figure 1:
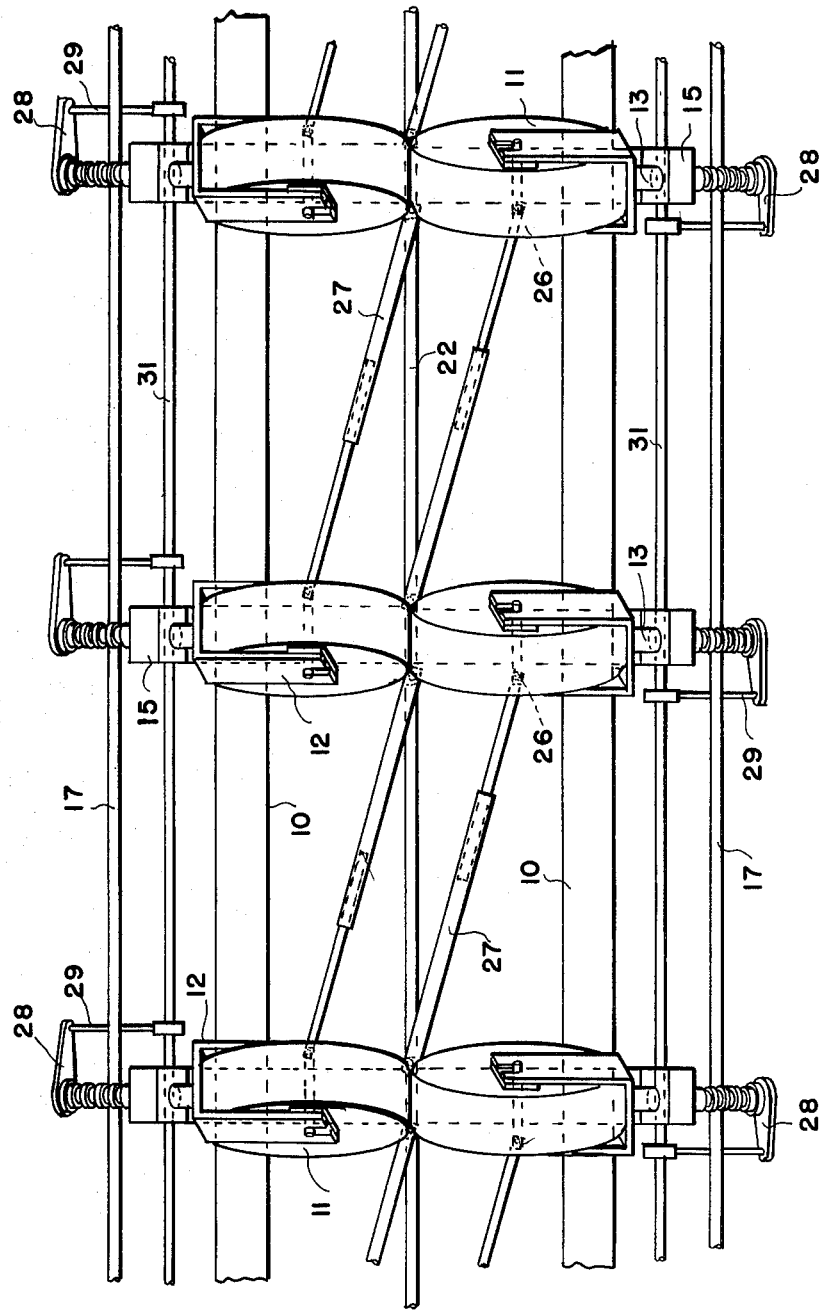
FIGURE 1 is a plan view of a section of pipe conveyor constructed in accordance with the principles of the invention.

The illustrated apparatus of the invention is assembled on a pair of longitudinally extending but transversely spaced beams or other supports 10 which, in practice, extend throughout the whole length of the conveyor and which are suitably secured to foundation blocks, not shown herein. The pipe is to be conveyed is supported at a plurality of longitudinally spaced points by a pair of opposed supporting rolls 11. While I have shown the rolls 11 in more or less schematic manner, in actual practice these are preferably formed of smooth, small-size pneumatic airplane wheels in which the tire is mounted on a small central hub. Whatever the specific construction, each of the rolls or wheels 11 is journaled in a fork or yoke 12 rigidly mounted on the inner end of a shaft 13.

At each roll station, I provide a transverse structural or supporting member 14 which rigidly carries at each of its outer ends a bored block 15 and a pillow block 16. The shafts 13 are longitudinally slideable and rotatable in the blocks 15 and are guided therein.

Continuous shafts 17, one on either side of the conveyor, are journaled in the pillow block 16 and have keyed thereto large-pitch spur gears 18, one for each of the shafts 13. As shown more clearly in FIGURE 2, the shafts 13 are machined to provide a series of annular teeth 19 for engagement by the teeth of the gears 18. In actual practice, the continuous shafts 17 are drivingly interconnected at some point along the conveyor line to rotate in opposite directions, and it should be apparent upon an inspection of FIGURE 2 that upon the rotation of these shafts the shafts 13 and consequently the rolls 11 will simultaneously move toward or away from each other along the axes of the shafts 13 while maintaining equi-distance from the center vertical plane of the conveyor assembly. Obviously, if the parts are properly constructed and assembled, the longitudinal central axis (represented by reference numeral 20, FIGURE 2) will lie in this center vertical plane. If small-diametered pipe is to be conveyed, the rolls 11 will be moved toward each other so as to elevate the points of support of the pipe and to prevent any appreciable descent of the axis 20 while yet engaging the outer surface of the pipe far enough up the sides thereof to resist any tendency of the pipe to roll off the conveyor sideways. For larger diametered pipe, the rolls 11 are moved further apart by rotation of the shafts 17 outwardly, as viewed from their top surfaces.

While not specifically disclosed or described herein, being mere matters of detail and design, it should be understood that suitable self-locking power means will be employed to adjustably rotate the continuous shafts 17, and that the control for such power means will be located at a convenient central position from which other functions of the complete production equipment will also be normally regulated.

Figure 3:
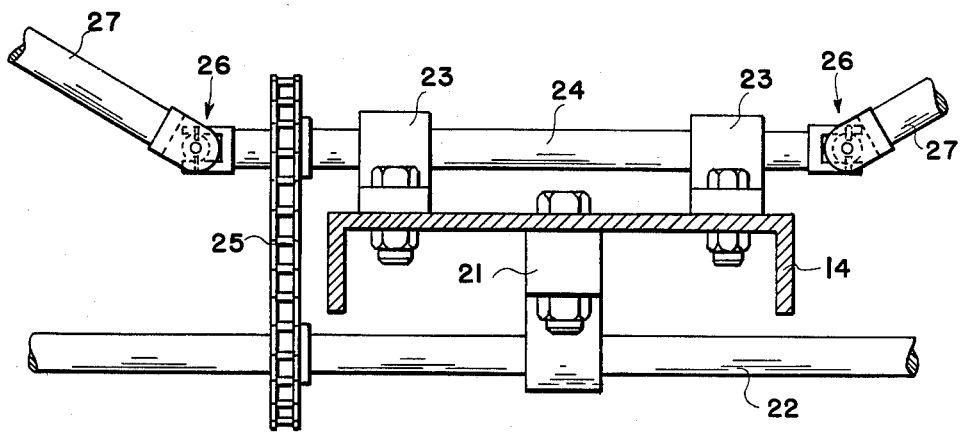
FIGURE 3 is a fragmentary section, on an enlarged scale, of the apparatus of FIGURE 2, the view being taken along the line III—III of FIGURE 2.

As shown, the rolls 11 are skewed to impart the desired spiral path of travel to the pipe, and to affect this propulsion the rolls are drive in the manner now to be described. Secured centrally beneath transverse structural members 14 are pillow blocks 21 (see FIG. 3) which journal a continuous longitudinal shaft 22. Shaft 22 is suitably power driven under control from a central point, as mentioned above. Journaled in pillow blocks 23 mounted centrally on each of the transverse structural member 14 is a short, longitudinally extending shaft 24 driven by shaft 22 through sprocket and chain assemblies 25. The opposite ends of the shafts 24 carry halves of universal joints 26, the other halves of which are rigidly carried on the ends of drive shafts 27. Shafts 27 have splined slip connections whereby they may automatically lengthen or shorten as the parts to which their universal joints move away or toward each other. These assemblies of drive shafts and universal joints are common articles of commerce, being widely used, for example, in driving farm equipment pulled behind a tractor and driven by the power takeoff shaft thereof. By referring to FIGURE 1, it should be observed that the drive shafts 27 and their associated universal joints interconnect the shafts 24 and the rolls 11 of the next adjacent pairs of rolls, and that the connections to the rolls are made on the sides thereof which are tilted down toward the plane of the supports 10 or of the supports 14. Of course, the universal joints 26 are also used to interconnect the drive shafts 27 with the rolls 11, suitable driving spindles being associated with each of the rolls. The connection arrangement of the shafts 27 reduces the angles to which the universal joints must operate. The extensibility of the shafts 27 permit the rolls to move through wide degrees of skew, which adjustment is accomplished by this invention in the manner now to be described.

Rigidly carried by the lower outer end of each of the shafts 13 is an arm 28 arranged to be rotated by a link 29. Links 29 are, in turn, arranged to be actuated by arms 30 rigidly carried by a pair of shafts 31, one along either side of the conveyor, and journaled in suitable bearings carried by the outer ends of the transverse structural members 14. Again, suitable means, not shown, is provided to rock the shafts 31 in unison and in opposite direction under control at a suitable centralized point.

Figure 2:
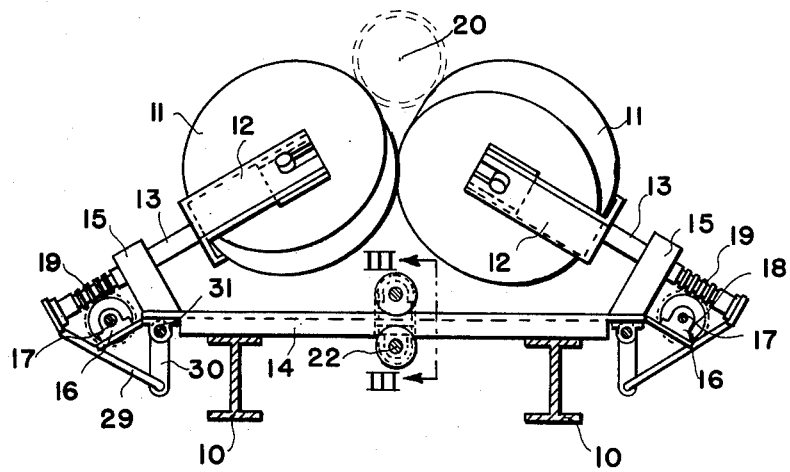
FIGURE 2 is a transverse section of the assembly of FIGURE 1.

Upon consideration of FIGURES 1 and 2, it will be apparent that rocking motion of the shafts 31 will be transmitted through arms 30, links 29 and arms 28 to the shafts 13 so that the latter may be rotated proportional to the rotation of the shafts 31. Since the shafts 31 extend throughout the whole length of the conveyor and are drivingly interconnected, it will be obvious that the adjustment of each of the rolls 11 will be equal when any adjustment is made in the skew of these rolls. If it is desired to lessen the longitudinal advance of the pipe with each revolution thereof, the skew of the rolls 11 is lessened—i.e., the rolls of each pair being brought more closely into a common plane. Increasing the skew will increase the lead given to the pipe with each revolution. This adjustment is made possible over a wide range by the use of the extensible drive shafts 27 and the universal joints 26. These parts also allow the rolls 11 of each pair to be moved toward and away from each other by the adjustment transmitted by shafts 17.

It should now be apparent that I have provided an improved pipe conveyor for moving pipe of widely varying diameters longitudinally along a spiral path with provisions for readily varying the lead or distance of longitudinal advancement of the pipe with each revolution. The apparatus illustrated is not only characterized by its simplicity and low cost but also by its ability to be precisely controlled from a central point for both roll spacing and skew. Another advantage of the apparatus of the invention is its versatility as regards setup, it being obvious that the roll pairs with their drives and adjustment both as to spacing and skew may be positioned and/or grouped as desired along the longitudinal extent of the beams 10 and the shafts 22, 17 and 31. It will be appreciated by those skilled in the pipe protection art that the illustrated arrangement will greatly facilitate the integration of the conveying equipment with the cleaning, coating and wrapping units of a plant and will also facilitate the correlation of the operation of the conveyor with the operation of these units in the day-to-day production of the plant.

The above specially described and illustrated embodiment of the invention should be taken as illustrative only since many changes may be made therein without departing from the spirit or scope of the invention. For example, instead of providing the rotatable annular teeth 19, a more conventional rack and pinion arrangement may be used with the shafts 13 rotatably guided with respect to the racks but restrained from movement relative to the racks in the direction of the longitudinal axes of the shafts. Various other alternatives and equivalence in mechanical details will readily come to mind, and accordingly the scope of the present invention should accordingly be delineated from the appended claims.

Having thus described my invention what I claim is:

1. In a conveyor for simultaneously imparting longitudinal and rotational movement to a length of pipe a longitudinally extending base, a plurality of supports extending transversely of said base at longitudinally spaced points, means at the transverse outer ends of each of said supports to slideably and rotatably support an upwardly and inwardly extending shaft, a pipe supporting roll journaled on the inner upper end of each of said shafts and adapted to have their axes of rotation skewed upon rotation of said shafts, first shaft means extending along said base to rotate said rolls about their axes, second shaft means extending along said base to advance said first mentioned shafts axially toward and away from each other whereby the pair of rolls carried thereby will be moved toward and away from each other, and third shaft means extending along said base to rotate said first mentioned shafts about their axes whereby the relative skew of the axes of said pair of rolls may be varied, each of said rolls having a supporting and driving spindle, said first shaft means comprising a continuous shaft journaled on and extending longitudinally of said base below said rolls, a longitudinally extending but short secondary shaft journaled on at least certain of said transverse supports and driven from said continuous shaft, and extensible drive rods each having a universal joint at either end interconnecting the ends of said secondary shafts and said spindles.

2. In a conveyor for simultaneously imparting longitudinal and rotational movement to a length of pipe a longitudinally extending base, a plurality of supports extending transversely of said base at longitudinally spaced points, means at the transverse outer ends of each of said supports to slideably and rotatably support an upwardly and inwardly extending shaft, a pipe supporting roll journaled on the inner upper end of each of said shafts and adapted to have their axes of rotation skewed upon rotation of said shafts, first shaft means extending along said base to rotate said rolls about their axes, second shaft means extending along said base to advance said first mentioned shafts axially toward and away from each other whereby the pair of rolls carried thereby will be moved toward and away from each other, and third shaft means extending along said base to rotate said first mentioned shafts about their axes whereby the relative skew of the axes of said pair of rolls may be varied, said second shaft means comprising a pair of continuous shafts journaled on the outer extremities of said transverse supports, and drive pinions on said last mentioned shafts meshing with rack arrangements on said upwardly and inwardly extending shafts whereby upon rotation of said pair of shafts said upwardly and inwardly extending shafts will move toward and away from each other along their own axes.

3. In a conveyor for simultaneously imparting longitudinal and rotational movement to a length of pipe a longitudinally extending base, a plurality of supports extending transversely of said base at longitudinally spaced points, means at the transverse outer ends of each of said supports to slideably and rotatably support an upwardly and inwardly extending shaft, a pipe supporting roll journaled on the inner upper end of each of said shafts and adapted to have their axes of rotation skewed upon rotation of said shafts, first shaft means extending along said base to rotate said rolls about their axes, second shaft means extending along said base to advance said first mentioned shafts axially toward and away from each other whereby the pair of rolls carried thereby will be moved toward and away from each other, and third shaft means extending along said base to rotate said first mentioned shafts about their axes whereby the relative skew of the axes of said pair of rolls may be varied, an arm rigidly connected to the outer end of each of said upwardly and inwardly extending shafts, said third shaft means comprising a pair of spaced continuous shafts journaled on said base on opposite sides thereof, and said last mentioned shafts having arms keyed thereto and linked to said first mentioned arms whereby upon rotation of said last mentioned pair of continuous shafts said first mentioned arms will rotate said upwardly and inwardly extending shafts about their longitudinal axes.

References Cited by the Examiner

UNITED STATES PATENTS 2,758,706  8/1956  Quinlan _____ 214—339

FOREIGN PATENTS 557,882  8/1932  Germany.

EVON C. BLUNK, *Primary Examiner.*

RICHARD E. AEGERTER, *Examiner.*